(12) United States Patent  
Konstant

(10) Patent No.: US 7,201,243 B2  
(45) Date of Patent: Apr. 10, 2007

(54) STORAGE CARTS

(75) Inventor: Anthony N. Konstant, Winnetka, IL (US)

(73) Assignee: Konstant Products, Inc.

( * ) Notice: Subject to any disclaimer, the term of this patent is extended or adjusted under 35 U.S.C. 154(b) by 98 days.

(21) Appl. No.: 10/874,657

(22) Filed: Jun. 22, 2004

(65) Prior Publication Data

US 2005/0279608 A1  Dec. 22, 2005

(51) Int. Cl.  
*B62B 3/00* (2006.01)
(52) U.S. Cl. .......................................... 180/20; 211/151
(58) Field of Classification Search ................ 211/151, 211/162; 312/201; 414/276; 105/245  
See application file for complete search history.

(56) References Cited

U.S. PATENT DOCUMENTS

| | | | | |
|---|---|---|---|---|
| 3,923,354 A | * | 12/1975 | Young | 312/201 |
| 4,290,166 A | * | 9/1981 | Melara | 16/47 |
| 4,467,924 A | * | 8/1984 | Morcheles | 211/1.57 |
| 4,537,577 A | * | 8/1985 | Sansome et al. | 446/445 |
| 4,559,027 A | * | 12/1985 | Sattel | 474/116 |
| 4,618,191 A | * | 10/1986 | Peterman | 312/201 |
| 4,944,231 A | * | 7/1990 | Leist | 104/287 |
| 5,024,164 A | * | 6/1991 | Leist | 105/101 |
| 5,137,159 A | * | 8/1992 | Collins et al. | 211/151 |
| 5,205,627 A | * | 4/1993 | Davison et al. | 312/201 |
| 5,482,422 A | * | 1/1996 | Hammond | 414/276 |
| 5,597,217 A | * | 1/1997 | Hoska et al. | 312/201 |
| 5,967,346 A | * | 10/1999 | Price, Jr. | 211/162 |
| 6,039,422 A | * | 3/2000 | Butters et al. | 312/201 |
| 6,161,485 A | * | 12/2000 | Muth | 105/96 |
| 6,231,138 B1 | * | 5/2001 | Janson | 312/201 |
| 6,363,860 B1 | * | 4/2002 | Andre | 105/72.2 |
| 6,471,309 B1 | * | 10/2002 | Turner | 312/201 |
| 6,526,702 B2 | * | 3/2003 | Jones | 52/64 |
| 6,669,314 B1 | * | 12/2003 | Nemec et al. | 312/201 |
| 6,688,708 B1 | * | 2/2004 | Janson | 312/200 |
| 6,843,180 B1 | * | 1/2005 | Keaton | 104/248 |
| 2005/0082246 A1 | * | 4/2005 | Krummell et al. | 211/151 |

OTHER PUBLICATIONS

Brochure: SYMOTECH AB, Symotech Pallet Drawer (English).  
Brochure: SYMOTECH AB, Symotech Pallet Drawer (Swedish).  
Brochure: Rack Engineering Division, Storage Products.  
Brochure: Proper Storage Systems, Shelf and Unit Construction.  
Web page: Frazier, Glide 'N Pick (2004).  
Brochure: E-Z Glide.

* cited by examiner

*Primary Examiner*—Richard E. Chilcot, Jr.  
*Assistant Examiner*—Colleen Quinn  
(74) *Attorney, Agent, or Firm*—Niro, Scavone, Haller & Niro

(57) ABSTRACT

Storage carts for the storage of pallets and other loads that may be moved between an open position into an aisle for access to the load and a closed position out of the aisle when desired.

13 Claims, 9 Drawing Sheets

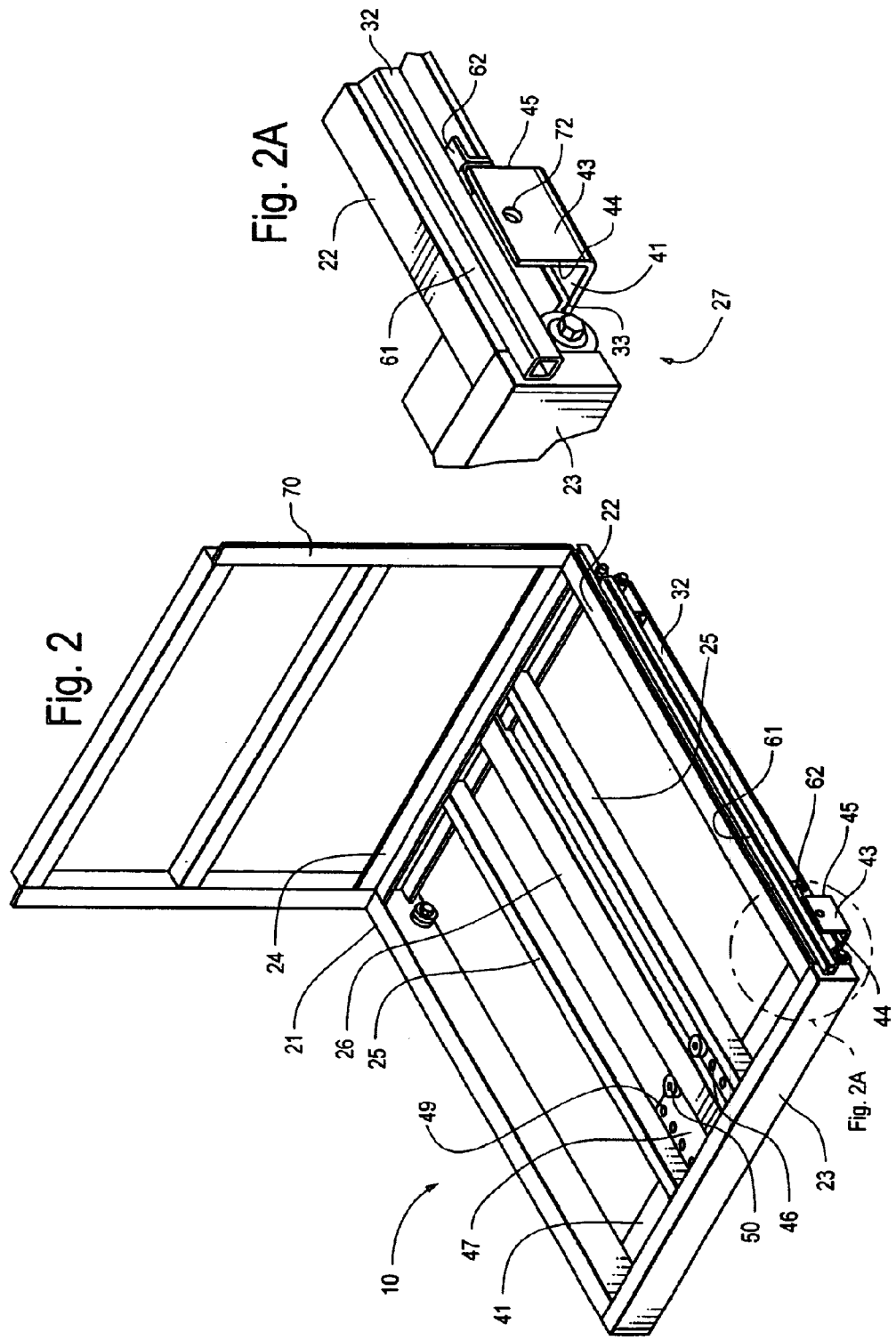

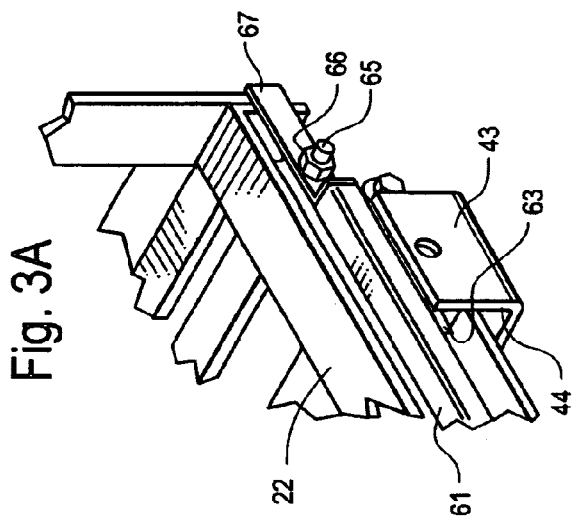
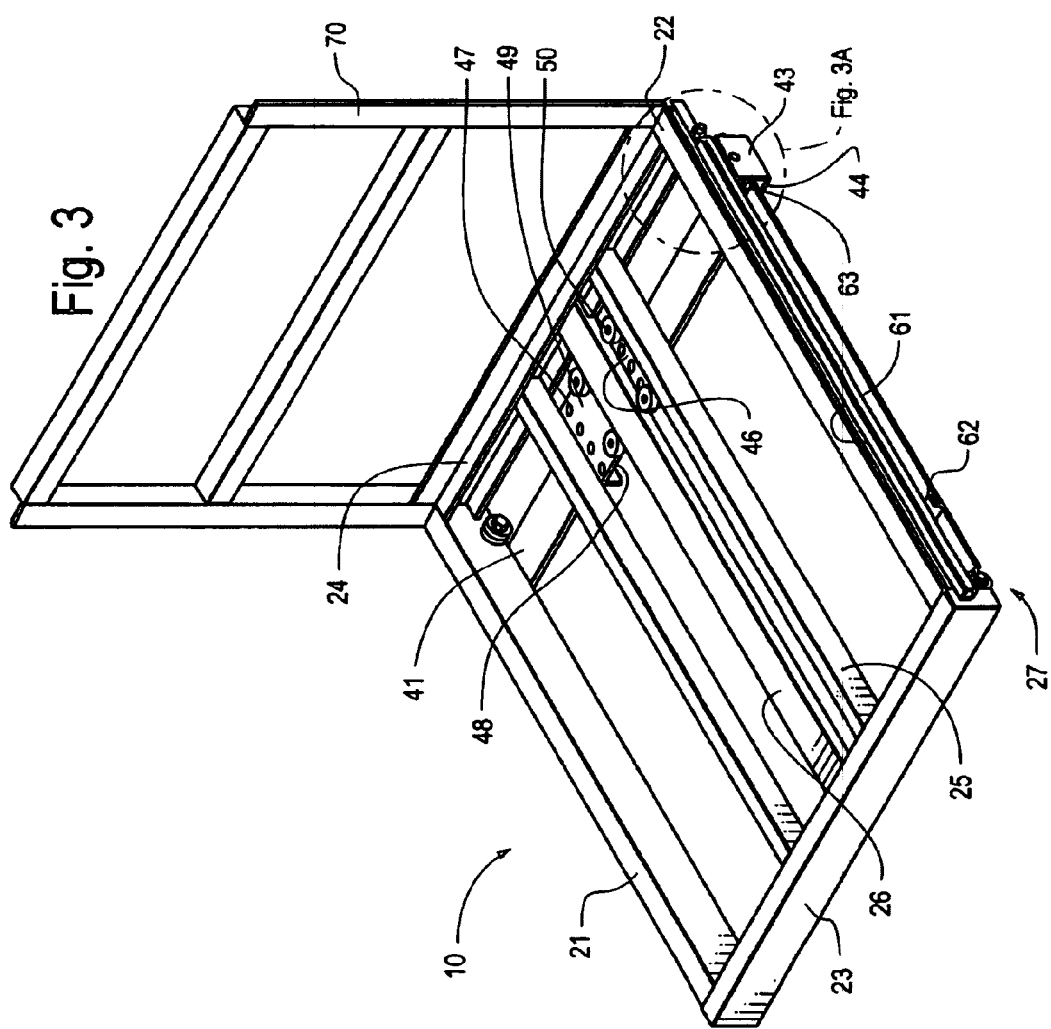

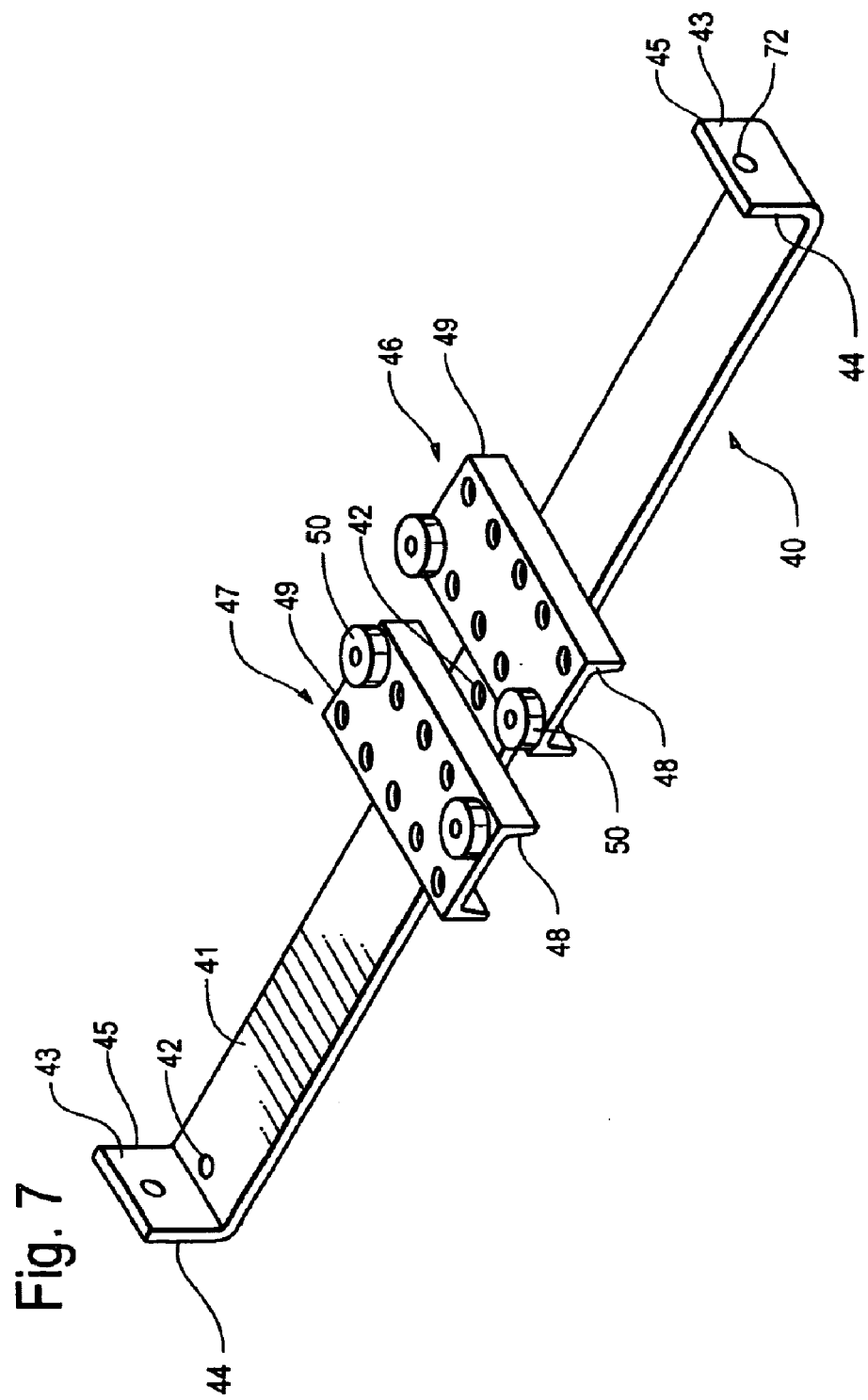

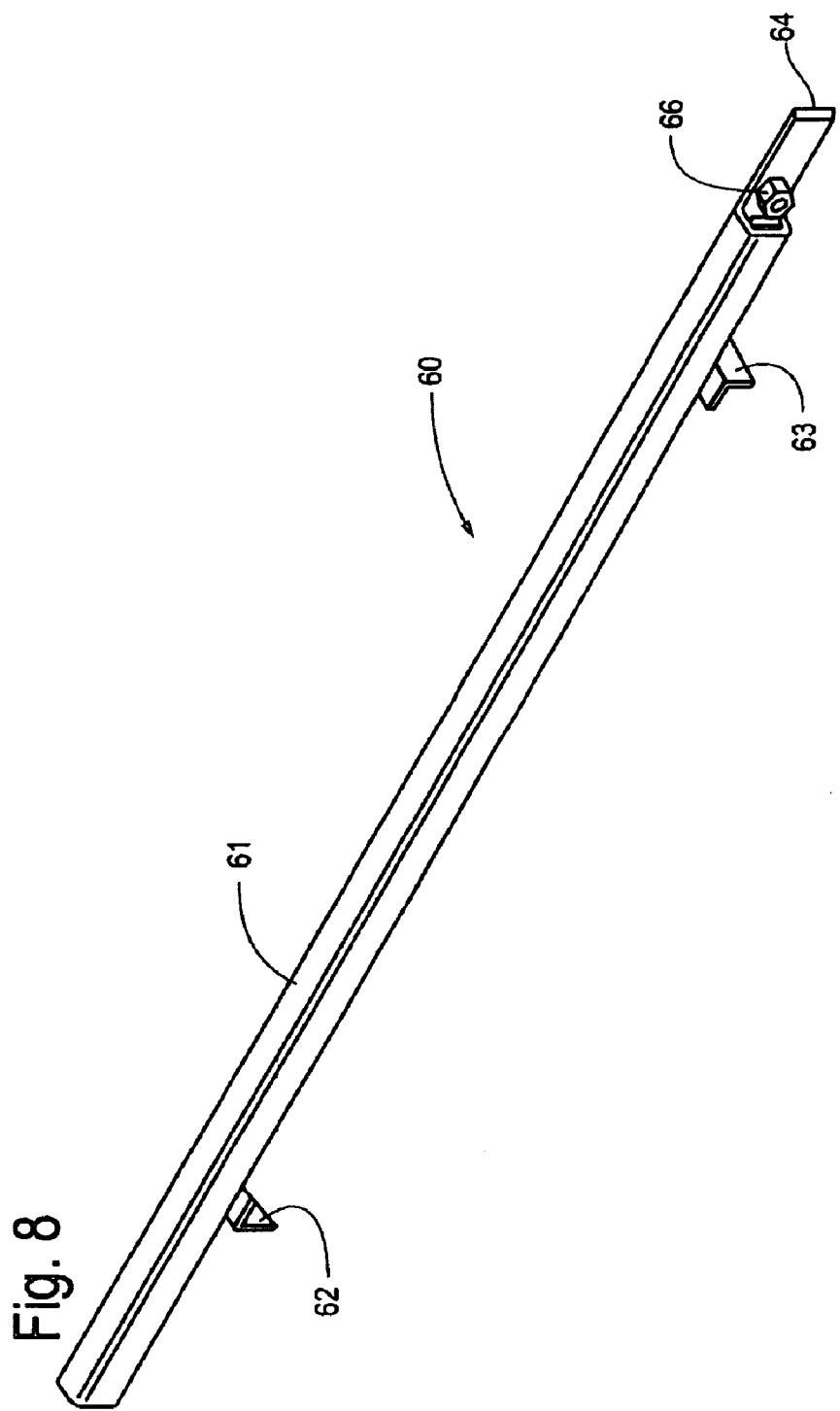

STORAGE CARTS

BACKGROUND OF THE INVENTION

The present inventions relate generally to storage devices that support pallets and other loads. More particularly, the present inventions relate to storage carts that are moveable between an open position where loads may be accessed and a closed position for storage. The storage carts of the present inventions are capable of supporting heavy loads, yet are efficiently moveable to permit easy access, may be secured against undesired movement and are guided against undesired lateral movement.

There are numerous types of storage systems available to store a variety of loads. For example, in the warehouse industry, shelf type storage systems are widely used. In general, many of these systems are configured to form shelves to support loads, pallets and their loads, and the like. Access to the stored loads is typically limited to warehouse personnel using fork lifts and the like.

At typical consumer warehouse stores, such as home improvement warehouses, inventory goods are stored in areas out of the reach of the public. In the same facility, individual items are accessible to the public and made available for consumer purchase. As a result of the increasing presence and popularity of such consumer warehouse stores, a need has developed to accommodate the efficient storage of heavy items (for example, bags of sand, concrete and gravel), while at the same time permitting convenient and safe access to these items by consumers and/or store personnel.

In a typical home improvement warehouse store, storage racks are arranged to form aisles for consumer and employee access. These racks are typically arranged in back to back arrays that may extend from the floor to ceiling height. A typical home improvement warehouse store receives a wide variety of goods that arrive on pallets. For inventory item storage, pallets and their loads are placed on shelves on the upper portion of the racks, usually above the reach of the consumer. The lower portion of the racks, which are under the upper storage shelves, form bays which are used to make individual items accessible to the consumer. For many types of items, displays or shelves are used within the bays to enable the selection of individual items by the consumer. Many such items may be easily reached by the consumer, regardless of whether those items are at the front of the bay or the rear of the bay. In this manner, the most inventory possible can be stored in the available space and the consumer has access to the products.

However, the storage and accessibility of relatively heavy items available at warehouse stores has created problems and potential safety hazards. For example, a home improvement warehouse store selling bags of ready mix concrete typically puts a pallet full of individual bags for consumer access in the storage bay created under the inventory storage shelves or racks. As the bags in the front of the pallet are sold, the remaining bags are on the rear of the pallet are located in the rear of the bay under the shelves. Because of their weight and location, these items become extremely difficult and awkward to access.

In such situations, store personnel could shift the pallet (or items on the pallet) to make the remaining items accessible, restock the pallet with additional items, or potentially lose a sale because a consumer foregoes a purchase when the item cannot be reached. However, personal injury could result to the consumer or store employee who attempts to lift a heavy item in an awkward position in the back of the storage bay.

Another way to avoid these problems is to place a load of the heavy items in the aisle, end cap or other area where there would be relatively unobstructed access to them. However, this is an inefficient use of space, can block aisles and lead to other problems.

To overcome the accessibility and other problems, some have attempted to develop moveable drawers for such items. These drawers are designed to be moveable from a rear position underneath the bay to a forward position generally into the aisle, where items on the rear of the pallet may be accessed. However, known devices suffer from a number of problems, including poor or difficult operation, complexity and expense.

SUMMARY OF THE INVENTION

The present inventions overcome the problems associated with the storage of and access to heavy items. For example, the present inventions provide a storage cart system having a storage cart capable of front to back movement of a load on a generally flat surface, the storage cart having a guide rail and wheels. A guide assembly secured to the generally flat surface is provided, the guide assembly cooperating with the guide rail to permit front to back movement of the cart without undesired lateral movement, and a handle or control arm pivotably mounted to the cart. The wheels of the wheeled cart of the present invention may include four wheel assemblies, each wheel assembly having two pairs of wheels on each side of a web of a support stringer of the cart. An axle that is flexibly mounted on the cart to permit vertical movement of the wheels is also provided. The guide assembly may further include a base, locking flanges, guide brackets and guide bearings.

The present inventions further provide for a storage cart for supporting a pallet or other load on a generally flat surface, the cart being moveable between a closed position and an open position, and having a guide rail. A guide assembly having a base secured to the generally flat surface, a guide bracket and a guide bearing attached to the guide bracket that cooperates with the guide rail are also provided. A control arm pivotably mounted to the cart and permitting the selective movement of the cart from an open position to a closed position is also provided, as well as a locking flange to prevent undesired movement.

The present inventions also provide, among other things, a storage cart for moveably storing a load, the cart being capable of movement along a generally horizontal support surface between a closed and an open position, the cart having a guide rail. The moveable storage cart also including wheel means for rollably supporting the cart on the surface, guide means for cooperating with the guide rail and preventing undesired lateral movement of the cart, control arm means for enabling the selective movement of the cart and locking means for securing the cart against undesired movement between an open and closed position.

Accordingly, an object of the present invention is to provide storage carts that may be moved between an open position and a closed position to provide ready access to goods stored on the carts.

Another object of the present invention is to provide a storage cart that may be secured against undesired opening or closing.

An additional object of the present invention is to provide a storage cart that has wheels that may move vertically to accommodate irregularity of the ground or horizontal support surface.

A further object of the present invention is to provide a moveable storage cart that may be moved as desired, but is controlled against undesired lateral movement.

Yet an additional object of the present invention is to provide a storage cart for use in storing heavy items in warehouse stores that may be selectively moved to an open position for access to the items and may be selectively moved out of the aisle and closed.

Yet a further object of the present invention is to provide a moveable storage cart that can be retrofitted into existing rack storage systems.

INVENTOR'S DEFINITION OF THE TERMS

The terms used in the claims of this patent are intended to have their broadest meaning consistent with the requirements of law. Where alternative meanings are possible, the broadest meaning is intended. All words used in the claims are intended to be used in the normal, customary usage of grammar and the English language.

BRIEF DESCRIPTION OF THE DRAWINGS

The stated and unstated features and advantages of the present inventions will become apparent from the following descriptions and drawings wherein like reference numerals represent like elements in the various views, and in which:

FIG. 2 is a perspective view of the preferred storage cart of FIG. 1, shown in a fully closed and locked position;

FIG. 2A is an exploded perspective view of details of the front cart components, guide assembly and control arm assembly of the storage cart of FIG. 2;

FIG. 3 is a perspective view of a preferred storage cart of FIG. 1 shown in a fully open and locked position;

FIG. 3A is an exploded perspective view of details of the rear cart components, guide assembly and control arm assembly of the storage cart of FIG. 3;

FIG. 7 is a perspective view of a preferred guide assembly of the present invention;

FIG. 8 is a perspective view of a preferred control arm assembly of the present invention; and, FIG. 9 is a perspective view of a preferred storage cart of the present invention shown with optional decking and optional backstop and in a fully retracted or closed position.

DETAILED DESCRIPTION OF PREFERRED EMBODIMENTS

Set forth below is a description of what is currently believed to be the preferred embodiments or best representative examples of the inventions claimed. Future and present alternatives and modifications to the embodiments and preferred embodiments are contemplated. Any alternatives or modifications which make insubstantial changes in function, purpose, structure or result are intended to be covered by the claims of this patent.

Typically, there is a front side of the storage rack structure of a warehouse store which is adjacent to an access aisle and a back side of the system which usually abuts another storage rack and to which there is typically no access from the front aisle. The present inventions will be described herein in non-limiting detail by reference to shelf-type storage systems that are typically found in consumer warehouse stores which are accessed only from one side, that is, the front or access aisle. However, the present inventions are fully applicable to a wide variety of other storage applications as well.

Figure 1:
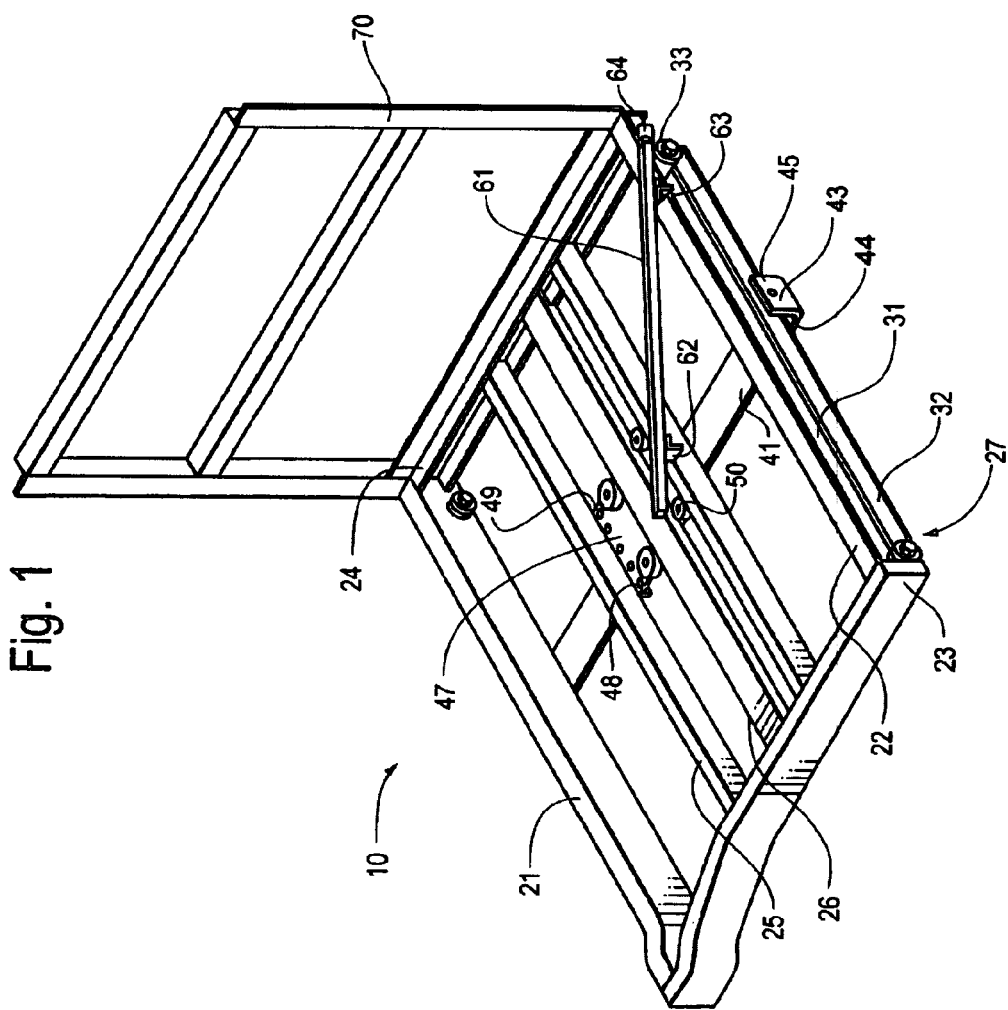
FIG. 1 is a perspective view of a preferred storage cart of the present invention shown in an intermediate position between the opened and closed positions and including an optional backstop.

A preferred embodiment of a storage cart of the present invention is shown generally as 10 in FIG. 1. It is designed to roll on a generally flat surface or floor (not shown) of a warehouse or consumer warehouse store, which is typically a concrete slab. The storage cart 10 is sized to support a standard pallet and its load and to fit within the bays created by typical shelf or rack type storage systems and below the shelves used for the storage of inventory items. As hereinafter described, storage cart 10 is substantially completely under a shelf and substantially out of the access aisle when in a fully retracted or closed position toward the rear of a storage bay, as shown in FIG. 2, and extends substantially into the aisle or out of the bay when in its fully extended or open position, as shown in FIG. 3.

It will be understood by those of skill in the art that the components of storage cart 10 and its related assemblies may be constructed from a wide variety of materials (e.g., iron, steel or aluminum) having a variety of cross-sectional shapes (such as channels, angles, tubing, I-beams and S-beams). However, these particular standard structural components are not required to practice the inventions, as other structural members of different cross sections may also be advantageously fabricated and employed to practice the claimed inventions.

Figure 4:
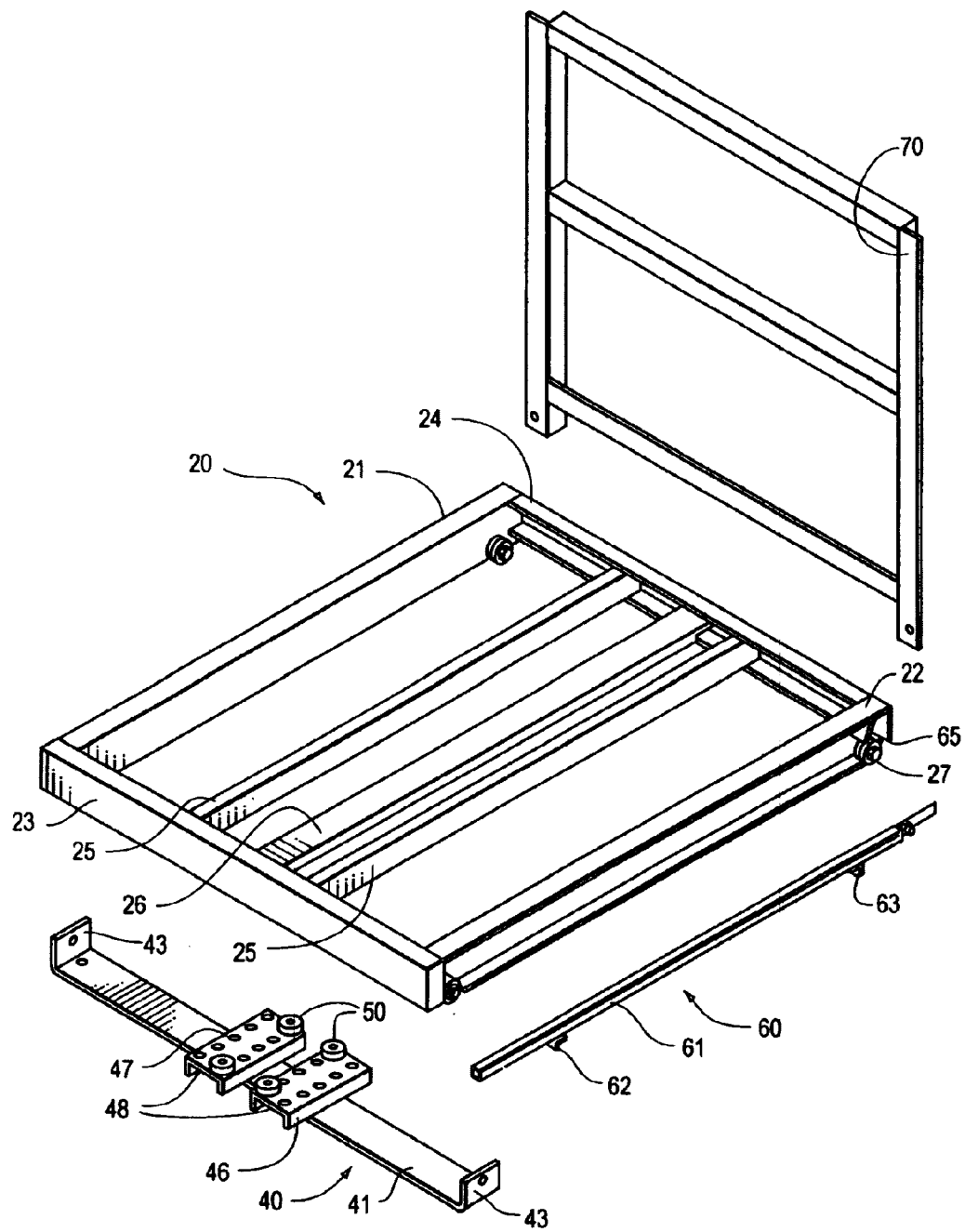
FIG. 4 is an exploded perspective view of a preferred storage cart of the present invention showing the cart assembly, guide assembly, control arm and an optional backstop.
Figure 5:
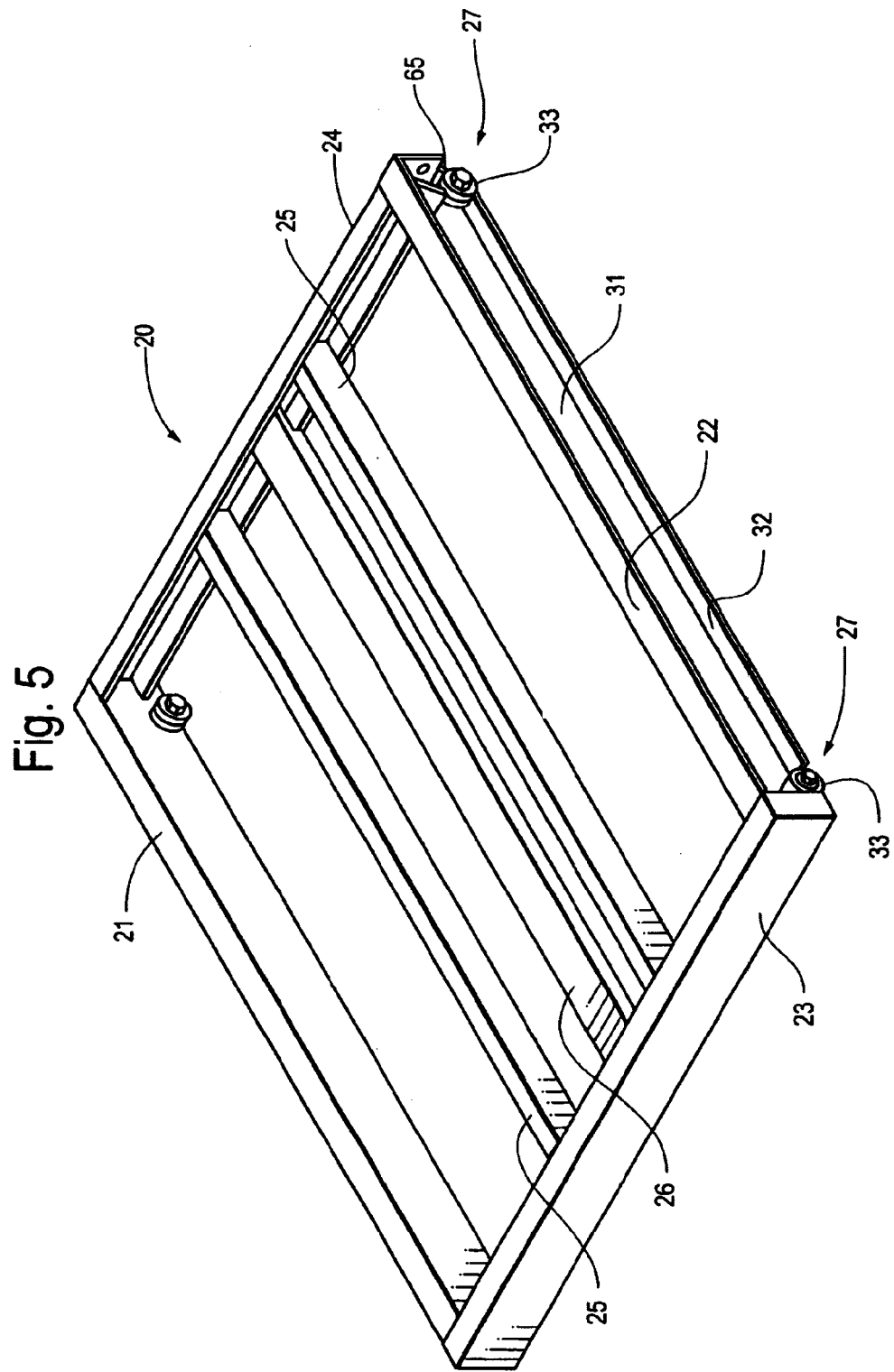
FIG. 5 is a perspective view of a preferred embodiment of a cart assembly of the present invention.
Figure 6:
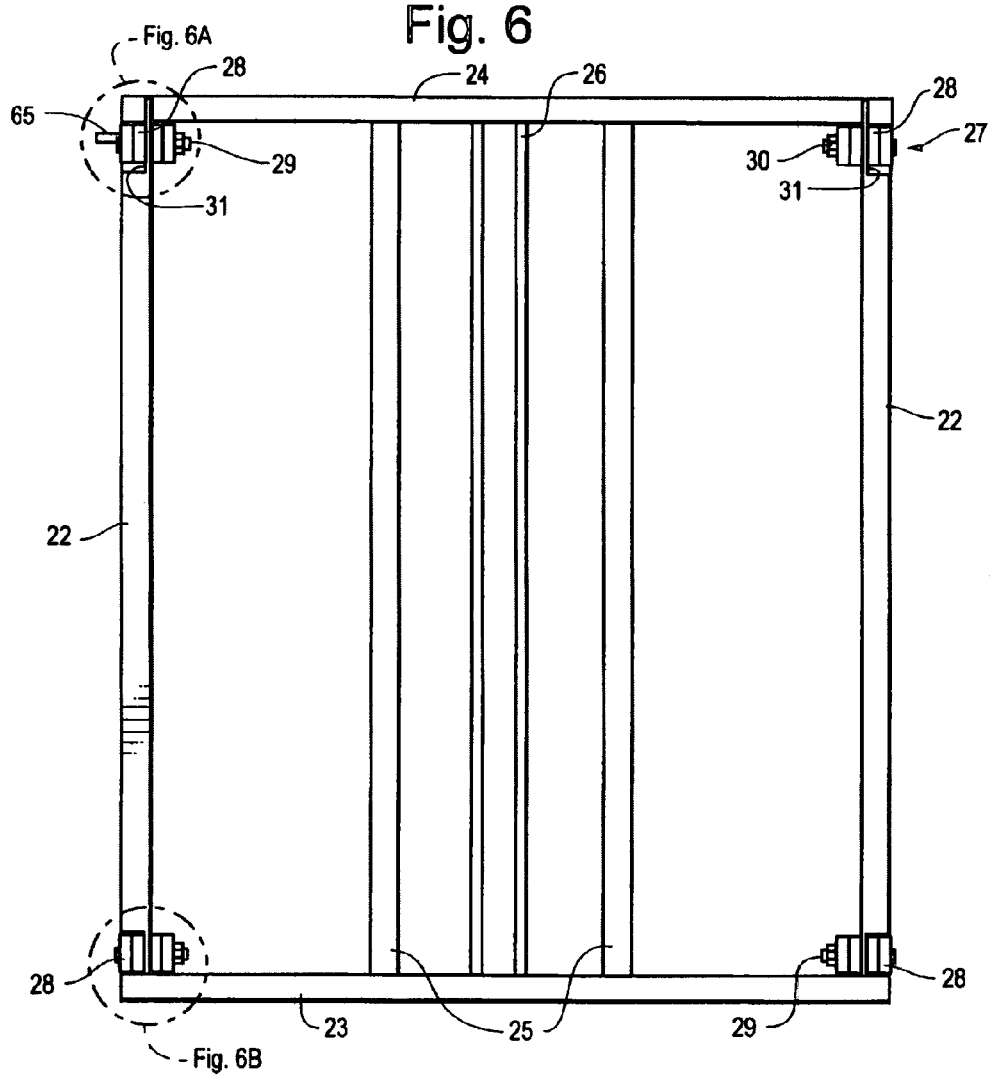
FIG. 6 is a bottom plan view of the storage cart of FIG. 5.
Figure 6A:
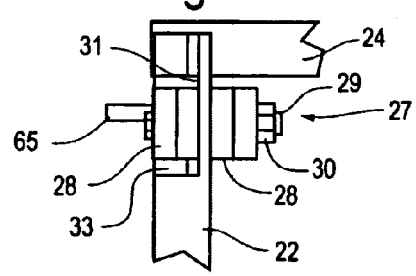
FIG. 6A is a detail plan view of components of a preferred rear wheel assembly of the cart of FIG. 6.
Figure 6B:
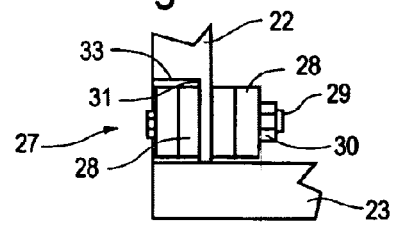
FIG. 6B is a detail plan view of components of a preferred front wheel assembly on the cart of FIG. 6.

The storage carts of the present invention generally include three principal component systems. As shown in FIG. 4, the present invention includes a wheeled cart assembly 20, a guide assembly 40 and a control arm assembly 60. As shown in FIGS. 4, 5 and 6, wheeled cart assembly 20 includes a left side support swinger 21 and a right side support stringer 22, both of which may be constructed from structural channels. Cart assembly 20 also includes a front support stringer 23 and a rear support stringer 24, which also may be constructed of structural channels. All of the support stringers 21, 22, 23 and 24 are connected together in a variety of well known ways, such as welding or bolts, to form a generally rectangular frame. Depending upon the application and design requirements, intermediate support members 25 may also be provided. Moreover, in a preferred embodiment of the present invention, a guide rail 26 is provided between front 23 and rear 24 stringers to interact with guide assembly 40 to prevent undesired lateral movement, as hereinafter described. Guide rail 26 may also be constructed or installed to serve as an intermediate support (not shown) for cart assembly 20.

Cart assembly 20 also includes wheel assemblies 27, preferably at each corner of the cart assembly 20. As best shown in FIG. 6, the preferred wheel assembly 27 includes two pairs of wheels 28, an axle 29 associated with each wheel assembly 27, as well as a nut 30 or other means for rotatably securing the wheels 28 to the axle 29. In the preferred embodiment, axle 29 is in the form of a bolt which is secured to nut 30.

Axle 29 passes through a hole (not shown) located in the web 31 (see also FIG. 5) of right stringer 22 and left stringer 23. In the preferred embodiment, the holes (not shown) through web 31 of left and right stringers 21 and 22 are of a larger diameter than axle 29. In this manner, vertical up and down movement of axle 29 of the wheel assemblies 27 is permitted to accommodate irregularities of the slab upon which the wheels 28 of cart assembly 20 ride during operation. Similarly preferred, but not required, is the use of split pairs of wheels 28 on either side of web 31. For example, single wheels 28 on either side of web 31 may be used. Alternatively, a single wheel 28 or caster (not shown) may be used to practice the invention by hinging or pivoting the caster at a point about the wheel 28 and attaching it to the cart assembly 20. In these manners, the wheels 28 of cart assembly 20 remain in rolling contact with the floor and provide flexibility to accommodate irregularities of the floor surface to permit smooth operation. It will be understood by those of skill in the art that the type of wheels 28 and/or wheel assemblies 27 selected, as well as their attachment to the cart assembly 20, will depend upon, among other things, the type of structures used for cart assembly 20, as well as cost considerations and the environment in which the devices are used.

In the preferred embodiment, the lower flange 32 of each side stringer 22 and 23 is provided with a notch 33 to permit the pair of wheels 28 on the outside of cart assembly 20 to contact the ground, slab or other surface (not shown). Because standard structural channels are used for the side stringers 22 and 23 for the described embodiment, no notches are required for the pair of wheels on the interior of cart assembly 20. It will be understood, however, that any structural member may be used and a notch 33 may or may not be necessary.

Guide assembly 40 of the present invention is best seen by reference to FIG. 7. Guide assembly 40 includes a base 41 which may be attached to the warehouse floor slab (not shown) through holes 42 or other readily available means. Base 41 is provided with upturned locking flanges 43 extending outside the width of cart assembly 20 that act to lock cart assembly 20 against undesired movement, as hereinafter described. Flanges 43 have front edges 44 and rear edges 45. Although flanges 43 are shown as integral with base 41, other structures, or separate structures, may be employed to perform the locking function, as hereinafter described.

A right guide bracket 46 and a left guide bracket 47 are also provided which may be attached to base 41 by welding or other well known means. Each guide bracket 46 and 47 has a front end 48 and a rear end 49. Guide bearings 50 are attached to guide brackets 46 and 47. Guide bearings 50 may be rollers, wheels, pads or other preferably low friction devices as will be understood by those of skill in the art. The spacing between right bracket 46 and left bracket 47, as well as the placement of guide bearings 50, is designed to movably cooperate with guide rail 26 of cart assembly 20, so that cart assembly 20 may be moved forward into the aisle and backward out of the aisle without undesired lateral movement or skewing. In a preferred embodiment, guide brackets 46 and 47 also serve to limit or contain the amount of cart movement between the open and closed positions, as hereinafter described.

The third principal assembly, control arm assembly 60 is best seen by reference to FIG. 8. In a preferred form, control arm assembly 60 includes a handle 61 that is pivotably mounted to the rear of cart assembly 20. Handle 61 is of sufficient length so that it may be readily gripped to move cart assembly 20, but not protrude into the aisle when the cart 20 is in a closed position. A front locking tab 62 and a rear locking tab 63 are provided on handle 61 to engage the front edge 44 or rear edge 45 of locking flange 43 to lock cart assembly 20 against undesired movement, as hereinafter described. The rear end of handle 61 is pivotally mounted to a pivot post 65 (see FIG. 5) of cart assembly 20 through a hole 66 on an alignment plate 64. In this manner, control arm 60 may rotate from a generally horizontal position along the plane of cart assembly 20 to a variety of vertical positions so that the cart assembly 20 may be moved when desired.

It will be understood by those of skill in the art that, although preferred, it is not required that control arm assembly 60 have a pivotably mounted handle 61 or that it be provided with means to lock the cart against undesired movement. In fact, a single pull type handle (not shown) may be attached to the cart assembly 20 to be pulled or pushed when movement of the cart is desired.

Having now described the primary assemblies and associated components of preferred embodiments of the present invention, its operation may be better seen by reference to FIGS. 1–3. FIG. 2 shows the storage cart 10 of the present inventions in a retracted or closed position, typically within the bay and substantially underneath shelf type storage racks. When in this position, the handle 61 of control arm 60 is in its lowest position. As shown in FIG. 2A, locking tab 62 of handle 61 engages the rear edge 45 of locking flange 43 so that cart assembly 20 may not roll or be pulled laterally out into the aisle.

When access to items (not shown) on the rear of the cart assembly 20 is desired, handle 61 may be rotated upward to an intermediate position as shown in FIG. 1. When the handle is lifted, front locking tab 62 disengages rear edge 45. Thus, when handle 61 is pulled, cart assembly 20 may roll laterally forward into the aisle. To prevent undesired lateral movement and aid in ease of pulling out the cart assembly 20, guide bearings 50 cooperate with guide rail 26. Cart assembly 20 may be extended until rear stringer 24 engages rear end 49 of guide brackets 46 and 47 to its fully extended or open position. At this point, as shown in FIG. 3, handle 61 may be lowered. In the preferred embodiment, handle 61 may be rotated to a variety of operative positions so that each user can leverage the handle 61 to move the cart 20 and its load as desired.

As shown in FIG. 3A, when handle 61 is lowered, cart assembly 20 may then be locked in a fully extended position. This locking function is accomplished in the preferred embodiment when the rear locking tab 63 of handle 61 is lowered and engages front edge 44 of locking flange 43. In this manner, the cart assembly 20 may not be inadvertently moved rearward when, for example, an item is being removed.

After unloading or as otherwise desired, handle 61 may be rotated vertically upward (see FIG. 1) so that rear locking tab 63 disengages front edge 44 and cart assembly 20 may be pushed rearward with handle 61. Cart assembly 20 is then permitted to roll rearward until front end 48 of guide brackets 46 and 47 come in contact with front stringer 23. When fully retracted, handle 61 may be rotated downward and locked into position as described above.

In a preferred embodiment, locking flange 43 is provided with a handle locking hole 72. Locking hole 72 is provided so that handle 61 may be locked into the lowered position by a pad lock or other device inserted in locking hole 72 and prevent the lifting and upward rotation of handle 61. Also in a preferred embodiment, handle 61 includes a rear alignment plate 64. Alignment plate 64 contacts the outer edge of rear stringer 24 during the rotation of handle 61. In this manner, when handle 61 is lifted and pulled or pushed to move cart assembly 20, handle 61 is kept in alignment with the edge of cart assembly 20.

Figure 9:
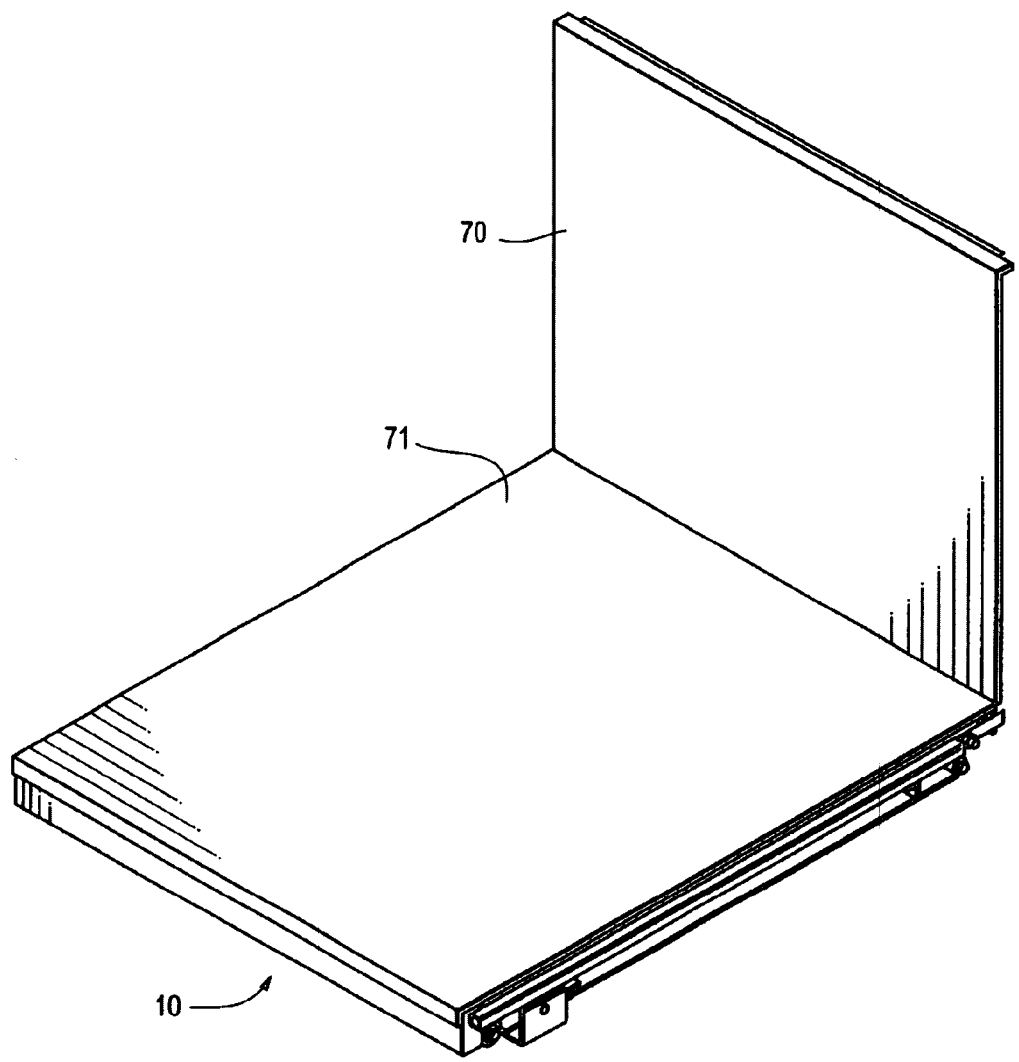

As shown in FIG. 9, cart assembly 20 may be provided with an optional backstop 70 to prevent items from falling behind cart assembly 20. And, also as shown in FIG. 9, optional decking 71 may be provided on cart assembly 20 and/or optional backstop 70.

The above description is not intended to limit the meaning of the words used in or the scope of the following claims that define the invention. Rather, it is contemplated that future modifications in structure, function or result will exist that are not substantial changes and that all such insubstantial changes in what is claimed are intended to be covered by the claims. Thus, while preferred embodiments of the present inventions have been illustrated and described, it will be understood that changes and modifications can be made without departing from the claimed invention.

Various features of the present inventions are set forth in the following claims.

What is claimed is:

1. A storage cart capable of front to back movement on a generally flat surface comprising:
    a cart having at least one pair of wheels on each side of said cart and a guide rail on said cart positioned between said pair of wheels, said guide rail generally parallel to the generally flat surface;
    a guide assembly securable to the generally flat surface, said guide assembly including a base, locking flanges, guide brackets and guide wheels, and cooperating with said guide rail to permit front to back movement of said cart without undesired lateral movement; and,
    a handle attached to said cart.

2. The storage cart of claim 1 wherein said wheels of said cart include four wheel assemblies, each wheel assembly having two pairs of wheels, one pair on each side of a support stringer of said cart.

3. The storage cart of claim 2 wherein an axle rotatably supports said wheels and said axle is mounted to said cart through oversized holes to permit vertical movement of said wheels to accommodate irregularities of the generally flat surface.

4. The storage cart of claim 1 wherein a control arm is pivotably attached to said cart.

5. The storage cart of claim 4 wherein locking tabs are provided on said control arm to engage said locking flange of said guide assembly.

6. The storage cart of claim 1 wherein the locking flanges of the guide assembly are integral with said base.

7. The storage cart of claim 1 including wheel means on said cart for permitting front to back movement of said cart on the generally flat surface.

8. A storage cart for supporting a pallet or other load on a generally flat surface, said cart moveable from a closed position to an open position, comprising:
    a cart having wheel supports and laterally spaced wheels on each side of said cart to permit said movement of said cart, and a guide rail positioned longitudinally between said laterally spaced wheels;
    a guide assembly securable to said generally flat surface, the guide assembly including a guide roller bracket and a guide that cooperate with said guide rail to prevent undesired lateral movement of said cart; and,
    a control arm pivotably mounted to said cart.

9. The storage cart of claim 8 wherein the control arm includes locking tabs.

10. The storage cart of claim 9 including a locking flange wherein said locking tabs cooperate with said locking flange to prevent undesired movement of said cart.

11. The storage cart of claim 8 wherein said wheels of said cast are mounted through oversized holes to permit vertical movement of said wheels to accommodate for irregularity of the generally flat surface.

12. The storage cart of claim 11 wherein two pairs of wheels are provided on each side of said wheel support.

13. A storage cart for moveably storing a load, said cart capable of movement along a generally horizontal support surface between a closed and an open position, said cart having a generally horizontal guide rail, comprising:
    means for rollably supporting said cart on said surface and for permitting movement between an open and closed position;
    guide means securable to the generally horizontal support surface, cooperating with said generally horizontal guide rail for preventing undesired lateral movement of said cart said guide means including guide wheels; and,
    means including a control for enabling the selective movement of said cart and the selective locking said cart against undesired movement.

* * * * *

UNITED STATES PATENT AND TRADEMARK OFFICE
CERTIFICATE OF CORRECTION

PATENT NO. : 7,201,243 B2
APPLICATION NO. : 10/874657
DATED : April 10, 2007
INVENTOR(S) : Anthony N. Konstant It is certified that error appears in the above-identified patent and that said Letters Patent is hereby corrected as shown below:

Column 8, line 17, "guide assembly including a guide roller bracket" should be changed to -- guide assembly including a guide bracket --;

Column 8, line 18, "guide that cooperates with said guide rail" should be changed to -- guide roller that cooperates with said guide rail --.

Signed and Sealed this

Twelfth Day of June, 2007

JON W. DUDAS
*Director of the United States Patent and Trademark Office*